United States Patent
Fedorova et al.

(10) Patent No.: US 11,727,336 B2
(45) Date of Patent: Aug. 15, 2023

(54) METHOD AND SYSTEM FOR DETERMINING RESULT FOR TASK EXECUTED IN CROWD-SOURCED ENVIRONMENT

(71) Applicant: YANDEX EUROPE AG, Lucerne (CH)

(72) Inventors: Valentina Pavlovna Fedorova, Sergiev Posad (RU); Gleb Gennadievich Gusev, Moscow (RU); Alexey Valerievich Drutsa, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 424 days.

(21) Appl. No.: 16/832,095

(22) Filed: Mar. 27, 2020

(65) Prior Publication Data

US 2020/0327582 A1 Oct. 15, 2020

(30) Foreign Application Priority Data

Apr. 15, 2019 (RU) ................................ 2019111283

(51) Int. Cl.
*G06Q 10/06* (2023.01)
*G06Q 30/02* (2023.01)
(Continued)

(52) U.S. Cl.
CPC ... *G06Q 10/06395* (2013.01); *G06F 9/30036* (2013.01); *G06F 18/23213* (2023.01);
(Continued)

(58) Field of Classification Search
CPC .......... G06Q 30/0279; G06Q 10/06395; G06F 9/30036; G06F 17/00; G06K 9/6223; G06K 9/6272; G06N 20/00
See application file for complete search history.

(56) References Cited

U.S. PATENT DOCUMENTS

| | | |
|---|---|---|
| 6,560,597 B1 | 5/2003 | Dhillon et al. |
| 7,366,705 B2 | 4/2008 | Zeng et al. |

(Continued)

FOREIGN PATENT DOCUMENTS

| | | | | |
|---|---|---|---|---|
| CN | 103914478 A | * | 7/2014 | ....... G06F 17/30867 |
| CN | 104463424 A | | 3/2015 | |

(Continued)

OTHER PUBLICATIONS

P. Radha Krishna, "An ER Framework for e-contract Modeling, enactment and monitoring", 2004, Data & Knowledge Engineering, 51, (2004), pp. 31-58. (Year: 2004).*

(Continued)

*Primary Examiner* — Tan D Nguyen
(74) *Attorney, Agent, or Firm* — BCF LLP

(57) ABSTRACT

A method and system for determining a result for a task executed in a crowd-sourced environment is disclosed. The method comprises receiving, a plurality of results of the task having been submitted by a plurality of human assessors; receiving a quality score for each human assessor of the plurality of human assessors; generating a plurality of vector representations comprising a vector representation for each of the results; mapping, the plurality of vector representations into a vector space; clustering the plurality of vector representations into at least a first cluster and a second cluster; executing a machine learning algorithm configured to generate a first confidence parameter and a second confidence parameter; in response to a given one of the first confidence parameter and the second confidence parameter (Continued)

meeting a predetermined condition, generating, an aggregated vector representation; and selecting the aggregated vector representation as the result of the task.

15 Claims, 8 Drawing Sheets

(51) Int. Cl.
    *G06F 9/30*     (2018.01)
    *G06N 20/00*     (2019.01)
    *G06Q 10/0639*     (2023.01)
    *G06Q 30/0279*     (2023.01)
    *G06F 18/23213*     (2023.01)
    *G06F 18/2413*     (2023.01)

(52) U.S. Cl.
    CPC ....... *G06F 18/24137* (2023.01); *G06N 20/00* (2019.01); *G06Q 30/0279* (2013.01)

(56) References Cited

U.S. PATENT DOCUMENTS

| | | | |
|---|---|---|---|
| 7,693,738 B2 | 4/2010 | Guinta et al. |
| 7,747,083 B2 | 6/2010 | Tawde et al. |
| 8,266,130 B2 | 9/2012 | Jones et al. |
| 8,498,892 B1 | 7/2013 | Cohen et al. |
| 8,554,605 B2 | 10/2013 | Oleson et al. |
| 8,626,545 B2 | 1/2014 | Van et al. |
| 9,268,766 B2 | 2/2016 | Bekkerman |
| 9,330,071 B1 | 5/2016 | Ahmed et al. |
| 9,584,540 B1 | 2/2017 | Chan et al. |
| 9,594,944 B2 | 3/2017 | Kompalli et al. |
| 9,767,419 B2 | 9/2017 | Venanzi et al. |
| 9,911,088 B2 | 3/2018 | Nath et al. |
| 10,061,848 B2 | 8/2018 | Basu et al. |
| 10,095,688 B1 | 10/2018 | Schilling et al. |
| 10,162,734 B1 | 12/2018 | Podgorny et al. |
| 10,445,671 B2 | 10/2019 | Dubey et al. |
| 10,685,329 B2 | 6/2020 | Taylor et al. |
| 10,978,056 B1 | 4/2021 | Challa et al. |
| 2002/0032591 A1 | 3/2002 | Mahaffy et al. |
| 2003/0154181 A1 | 8/2003 | Liu et al. |
| 2006/0026240 A1 | 2/2006 | Anthony et al. |
| 2007/0226207 A1 | 9/2007 | Tawde |
| 2007/0260601 A1 | 11/2007 | Thompson et al. |
| 2008/0027913 A1 | 1/2008 | Chang et al. |
| 2008/0120129 A1* | 5/2008 | Seubert ................ G06Q 40/125 |
| | | | 705/305 |
| 2009/0204470 A1 | 8/2009 | Weyl et al. |
| 2010/0153156 A1 | 6/2010 | Guinta et al. |
| 2010/0293026 A1 | 11/2010 | Vojnovic et al. |
| 2011/0173183 A1 | 7/2011 | Dasdan et al. |
| 2011/0313801 A1 | 12/2011 | Biewald et al. |
| 2012/0005131 A1 | 1/2012 | Horvitz et al. |
| 2012/0131572 A1 | 5/2012 | Shae et al. |
| 2012/0150579 A1 | 6/2012 | De Wit et al. |
| 2012/0265573 A1 | 10/2012 | Van et al. |
| 2013/0006717 A1 | 1/2013 | Oleson et al. |
| 2013/0029769 A1 | 1/2013 | Lee et al. |
| 2013/0096968 A1 | 4/2013 | Van Pelt et al. |
| 2013/0111488 A1 | 5/2013 | Gatti et al. |
| 2013/0132080 A1 | 5/2013 | Williams et al. |
| 2013/0159292 A1* | 6/2013 | Larlus ................... G06F 16/40 |
| | | | 707/E17.084 |
| 2013/0231969 A1 | 9/2013 | Van et al. |
| 2014/0122188 A1 | 5/2014 | Van Pelt et al. |
| 2014/0172767 A1 | 6/2014 | Chen et al. |
| 2014/0229413 A1 | 8/2014 | Dasgupta et al. |
| 2014/0278634 A1 | 9/2014 | Horvitz et al. |
| 2014/0343984 A1 | 11/2014 | Shahabi et al. |
| 2014/0355835 A1* | 12/2014 | Rodriguez-Serrano ................ |
| | | | G06V 20/63 |
| | | | 382/105 |
| 2015/0004465 A1 | 1/2015 | Ozaki et al. |
| 2015/0074033 A1 | 3/2015 | Shah et al. |
| 2015/0086072 A1 | 3/2015 | Kompalli et al. |
| 2015/0178659 A1 | 6/2015 | Dai et al. |
| 2015/0213392 A1 | 7/2015 | Kittur et al. |
| 2015/0254593 A1 | 9/2015 | Ramos et al. |
| 2015/0254596 A1 | 9/2015 | Nayar et al. |
| 2015/0254785 A1 | 9/2015 | Yang et al. |
| 2015/0262111 A1 | 9/2015 | Yu et al. |
| 2015/0317582 A1 | 11/2015 | Nath et al. |
| 2015/0347519 A1 | 12/2015 | Hornkvist et al. |
| 2015/0356488 A1 | 12/2015 | Eden et al. |
| 2015/0356489 A1 | 12/2015 | Kazai et al. |
| 2015/0363741 A1 | 12/2015 | Chandra et al. |
| 2016/0041849 A1 | 2/2016 | Naveh et al. |
| 2016/0100000 A1 | 4/2016 | Dey et al. |
| 2016/0132815 A1 | 5/2016 | Itoko et al. |
| 2016/0140477 A1 | 5/2016 | Karanam et al. |
| 2016/0210570 A1 | 7/2016 | Lee et al. |
| 2016/0232221 A1 | 8/2016 | Mccloskey et al. |
| 2016/0035785 A1 | 12/2016 | Fan et al. |
| 2017/0011077 A1 | 1/2017 | Kypreos et al. |
| 2017/0024931 A1 | 1/2017 | Sheffer et al. |
| 2017/0046794 A1 | 2/2017 | Shukla et al. |
| 2017/0052761 A1 | 2/2017 | Gunshor et al. |
| 2017/0061341 A1 | 3/2017 | Haas et al. |
| 2017/0061356 A1 | 3/2017 | Haas et al. |
| 2017/0061357 A1 | 3/2017 | Dubey et al. |
| 2017/0076715 A1* | 3/2017 | Ohtani ................... G10L 13/04 |
| 2017/0103451 A1 | 4/2017 | Alipov et al. |
| 2017/0154313 A1 | 6/2017 | Duerr et al. |
| 2017/0185944 A1 | 6/2017 | Volkov et al. |
| 2017/0200101 A1 | 7/2017 | Kumar et al. |
| 2017/0220973 A1 | 8/2017 | Byham et al. |
| 2017/0228749 A1 | 8/2017 | Larvol et al. |
| 2017/0293859 A1 | 10/2017 | Gusev et al. |
| 2017/0309193 A1 | 10/2017 | Joseph et al. |
| 2017/0353477 A1 | 12/2017 | Faigon et al. |
| 2017/0364810 A1 | 12/2017 | Gusev et al. |
| 2017/0372225 A1 | 12/2017 | Foresti et al. |
| 2018/0005077 A1 | 1/2018 | Wang et al. |
| 2018/0143980 A1* | 5/2018 | Tanikella .............. G06F 16/285 |
| 2018/0144283 A1 | 5/2018 | Freitas et al. |
| 2018/0144654 A1 | 5/2018 | Olsen |
| 2018/0196579 A1 | 7/2018 | Standefer et al. |
| 2018/0293325 A1 | 10/2018 | Manickavasagam |
| 2018/0331897 A1 | 11/2018 | Zhang et al. |
| 2018/0357286 A1 | 12/2018 | Wang et al. |
| 2019/0258985 A1 | 8/2019 | Guastella et al. |
| 2019/0318291 A1 | 10/2019 | Diriye et al. |
| 2019/0392547 A1* | 12/2019 | Katouzian ............ G06N 3/0454 |
| 2020/0327582 A1 | 10/2020 | Fedorova et al. |
| 2020/0372338 A1 | 11/2020 | Woods et al. |

FOREIGN PATENT DOCUMENTS

| | | | | |
|---|---|---|---|---|
| CN | 105608318 A | 5/2016 | | |
| CN | 106203893 A | 12/2016 | | |
| CN | 106327090 A | 1/2017 | | |
| CN | 106446287 A | 2/2017 | | |
| CN | 106557891 A | 4/2017 | | |
| CN | 107767055 A | 3/2018 | | |
| CN | 107767058 A | 3/2018 | | |
| CN | 107909262 A | 4/2018 | | |
| CN | 104794573 B | 5/2018 | | |
| CN | 109272003 A | 1/2019 | | |
| CN | 109376237 A * | 2/2019 | | |
| CN | 109522545 A * | 3/2019 | ............ | G06F 40/30 |
| CN | 109544504 A * | 3/2019 | | |
| CN | 109670727 A | 4/2019 | | |
| CN | 110020098 A | 7/2019 | | |
| CN | 110503396 A | 11/2019 | | |
| CN | 110909880 A | 3/2020 | | |
| CN | 110928764 A | 3/2020 | | |
| CN | 111191952 A | 5/2020 | | |
| CN | 111291973 A | 6/2020 | | |
| CN | 111723930 A | 9/2020 | | |
| EP | 3438897 A1 | 2/2019 | | |
| KR | 102155790 B1 | 9/2020 | | |
| KR | 102156582 B1 | 9/2020 | | |

(56) References Cited

FOREIGN PATENT DOCUMENTS

| RU | 2632143 C1 | 10/2017 | | |
|---|---|---|---|---|
| RU | 2672171 C1 | 11/2018 | | |
| WO | WO-0010296 A2 | * | 2/2000 | ............ H04W 28/16 |
| WO | 2017222738 A1 | 12/2017 | | |

OTHER PUBLICATIONS

Thorsten Hampel, "A Collaborative Document Management Environment for Teaching and Learning", 2000, CVE, San Francisco, pp. 197-198. (Year: 2000).*
Beate List, "An Evaluation of Conceptual Business Process Modelling Languages", Apr. 23, 2006, SAC'06, pp. 1532-1539. (Year: 2006).*
Steffen Schnitzer, "Demands on task recommendation in crowdsourcing platforms—the worker's perspective", 2015, CrowdRec 19, 2015, pp. 1-6. (Year: 2015).*
Sina Sajadmanesh, "NP-GLM: A Non-Parametric Method for Temporal Link Prediction", 2017, Dept. of Computer Engineering, Sharif University of Technology, Tehran, Iran, pp. 1-7. (Year: 2017).*
Office Action issued in respect of the related U.S. Appl. No. 16/852,512.
Yu, "Software Crowdsourcing Task Allocation Algorithm Based on Dynamic Utility", IEEE Access (vol. 7) pp. 33094-33106, Published Mar. 13, 2019.
Huang, "Enhancing reliability using peer consistency evaluation in human computation". Published Mar. 18, 2013 in CSCW 2013—Proceedings of the 2013 ACM Conference on Computer Supported Cooperative Work (pp. 639-647). Proceedings of the ACM Conference on Computer Supported Cooperative Work, CSCW). https://doi.org/10.1145/2441776.2441847.
Qiu, "CrowdEval: A Cost-Efficient Strategy to Evaluate Crowdsourced Worker's Reliability", AAMAS '18: Proceedings of the 17th International Conference on Autonomous Agents and MultiAgent Systems, Jul. 2018, pp. 1486-1494.
Hung, "An Evaluation of Aggregation Techniques in Crowdsourcing", Web Information Systems Engineering—WISE 2013, 2013, vol. 8181, ISBN : 978-3-642-41153-3.
Vaibhav B. Sinha et al., "Fast Dawid-Skene: A Fast Vote Aggregation Scheme for Sentiment Classification", Department of Computer Science and Engineering, Indian Institute of Technology Hyderabad, Telangana, Sep. 7, 2018; https://arxiv.org/abs/1803.02781.
Hongwei Li et al., "Error Rate Bounds in Crowdsourcing Models", Department of Statistics, UC Berkeley, Department of EECS, UC Berkeley and Microsoft Research, Redmond, Jul. 10, 2013. https://arxiv.org/pdf/1307.2674.pdf.
Hongwei Li et al., "Error Rate Bounds and Iterative Weighted Majority Voting for Crowdsourcing", University of California, Berkeley, Nov. 15, 2014; https://arxiv.org/pdf/1411.4086.pdf.
Hideaki et al., "Analysis of Minimax Error Rate for Crowdsourcing and its Application to Worker Clustering Model", https://arxiv.org/pdf/1802.04551.pdf Jun. 9, 2018.
Changbo et al., "Online Crowdsourcing", https://arxiv.org/abs/1512.02393, Submitted on Dec. 8, 2015 (v1), last revised Feb. 8, 2019 (this version, v2).

Vikas et al., "Eliminating Spammers and Ranking Annotators for Crowdsourced Labeling Tasks", Journal of Machine Learning Research 13 (2012) 491-518; http://www.jmlr.org/papers/volume13/raykar12a/raykar12a.pdf.
Feldman et al., "Behavior-Based Quality Assurance in Crowdsourcing Markets", Zurich Open Repository and Archive, University of Zurich, 2014. https://www.zora.uzh.ch/id/eprint/98779/1/Feldman.pdf.
Lease, "On Quality Control and Machine Learning in Crowdsourcing", School of Information, University of Texas at Austin; 2011, https://www.ischool.utexas.edu/~ml/papers/lease-hcomp11.pdf.
Gadiraju, "Understanding Malicious Behavior in Crowdsourcing Platforms: The Case of Online Surveys", http://eprints.whiterose.ac.uk/95877/1/Understanding%20malicious%20behaviour.pdf; 2015 https://doi.org/10.1145/2702123.2702443.
Carsten Eickhoff, "Cognitive Biases in Crowdsourcing", Dept. of Computer Science, Zurich, Switzerland, 2018, https://brown.edu/Research/AI/files/pubs/wsdm18.pdf.
Ece Kamar, "Identifying and Accounting for Task-Dependent Bias in Crowdsourcing", Microsoft Research, Redmond, WA, USA, 2015. http://erichorvitz.com/hcomp_2015_learning_bias.pdf.
D. Sánchez-Charles, "Worker ranking determination in crowdsourcing platforms using aggregation functions," 2014 IEEE International Conference on Fuzzy Systems (FUZZ-IEEE), Beijing, 2014, pp. 1801-1808.
Khazankin, "QOS-Based Task Scheduling in Crowdsourcing Environments", Distributed Systems Group, Vienna University of Technology, Argentinierstrasse 8/184-1, A-1040 Vienna, Austria, 2011.
Yuen, "Task recommendation in crowdsourcing systems", Crowdkdd '12 Proceedings of the First International Workshop on Crowdsourcing and Data Mining, pp. 22-26, Beijing, China, Aug. 2012.
Russian Search Report dated Jan. 15, 2021 issued in respect of the counterpart Russian Patent Application No. RU2019116267.
Russian Search Report dated Dec. 16, 2020 issued in respect of the counterpart Russian Patent Application No. RU2019111283.
Ustalov "Towards the Automated Collaborative Process for Language Resource Construction", Inzhenernyy vestnik Dona Journal, Issue No. 1(48), Published Mar. 20, 2018.
Notice of Allowance dated Jun. 1, 2022 in respect of the related U.S. Appl. No. 16/503,977.
Notice of Allowance dated May 16, 2022 received in respect of a related U.S. Appl. No. 16/777,790.
Li et al.,"Crowdsourced Data Management: A Survey", Published on Apr. 19, 2017, IEEE Transactions on Knowledge and Data Engineering, pp. 1-23, DOI:10.1109/ICDE.2017.26.
Federova et al.,"Latent Distribution Assumption for Unbiased and Consistent Consensus Modelling", Published on Jun. 20, 2019, arXiv:1906.08776v1.
Bugakova et al.,"Aggregation of pairwise comparisons with reduction of biases", Published on Jun. 9, 2019, arXiv:1906.03711v1.
Simpson et al., "Scalable Bayesian Preference Learning for Crowds", Published on Dec. 11, 2019 arXiv:1912.01987v2.
Notice of Allowance dated Jun. 2, 2022 received in respect of a related U.S. Appl. No. 16/906,074.
Chittilappilly et al. "A Survey of General-Purpose Crowdsourcing Techniques", Published on Sep. 1, 2016, IEEE Transactions on Knowledge and Data Engineering, vol. 28, Issue 9, pp. 2246-2266.

* cited by examiner

METHOD AND SYSTEM FOR DETERMINING RESULT FOR TASK EXECUTED IN CROWD-SOURCED ENVIRONMENT

CROSS-REFERENCE

The present application claims priority to Russian Patent Application No. 2019111283, entitled "Method and System for Determining Result for Task Executed in Crowd-Sourced Environment", filed Apr. 15, 2019, the entirety of which is incorporated herein by reference.

FIELD

The present technology relates to methods and systems for determining a result of a task, and more particularly methods and systems for determining a result in a crowd-sourced environment.

BACKGROUND

Crowdsourcing platforms, such as the Amazon Mechanical Turk™, make it possible to coordinate the use of human intelligence to perform tasks that computers are currently unable to do in a shorter time and at a lower cost compared to that needed by professional assessors. However, as assessors on crowdsourcing platforms are generally non-professional and vary in levels of expertise, the obtained results also vary. This is especially so where the task is a non-multiple-choice task.

Indeed, where the task requires a textual input from the assessor (such as a translation task, or a speech-to-text conversion task) where the answer is unknown, it is difficult for the crowdsourcing platform to convert all the received results to generate a single result.

Chinese Patent Application Publication No. 106446287 A published Feb. 22, 2017, to Beijing University of Posts and Telecommunications, and titled "Answer Aggregation Method and System Facing Crowdsourcing Scene Question-Answering System" discloses an answer aggregation method and system facing crowdsourcing scene question-answering system. The method comprises the steps of obtaining multiple reply texts with respect to a specified question, wherein each reply text comprises a pro vote and a con vote of other users; conducting text analysis of a theme and key words on each reply text, and further creating a vector set; clustering all vector sets, combining all similar replies into a sort, and calculating the pro votes and the con votes of each sort of similar replies; supplying a questioner with the replies with a preset number of replies in the each sort of similar replies and a calculation result corresponding to the pro votes and the con votes. The answer aggregation method and system facing crowdsourcing scene question-answering system has the advantages that by supplying the questioner with sorts of the answers and the calculation result of the pro votes and the con votes corresponding to the sorts of the answers, redundant time for the questioner to read a lot of answers with similar meanings is saved, a more general level of support of public opinion is presented for the questioner, and the users can be helped to make own judgment and determination more efficiently United States Patent Application Publication No. 2003/0154181 A1 published Aug. 14, 2003, to NEC Corp., and titled "Document Clustering with Cluster Refinement and Model Selection Capabilities" discloses a document partitioning (flat clustering) method to cluster documents with high accuracy and accurately estimates the number of clusters in the document corpus (i.e. provides a model selection capability). To accurately cluster the given document corpus, a richer feature set is employed to represent each document, and the Gaussian Mixture Model (GMM) together with the Expectation-Maximization (EM) algorithm is used to conduct an initial document clustering. From this initial result, a set of discriminative features is identified for each cluster, and the initially obtained document clusters are refined by voting on the cluster label for each document using this discriminative feature set. This self refinement process of discriminative feature identification and cluster label voting is iteratively applied until the convergence of document clusters. Furthermore, a model selection capability is achieved by introducing randomness in the cluster initialization stage, and then discovering a value C for the number of clusters N by which running the document clustering process for a fixed number of times yields sufficiently similar results.

SUMMARY

Non-limiting embodiments of the present technology have been developed based on developers' appreciation of at least one technical problem associated with the prior art solutions.

Developers of the present technology have appreciated certain technical drawbacks associated with the existing prior art. Firstly, assessors on the crowdsourcing platform are often not professional, and/or unmotivated, which may lead to poor results. In a situation where the results submitted by the unmotivated or untrustworthy assessors are dominant in the task, it is difficult to properly determine a consensus result, especially when the task is one that requires textual input from the assessors. Secondly, even if the majority of the assessors are motivated and trustworthy, it is still difficult to properly select a single consensus result of a task that requires textual input from the assessors without the need of a trusted human assessor to select the correct result.

In accordance with a first broad aspect of the present technology, there is provided a computer-implemented method of determining a result for a task executed in a crowd-sourced environment, the task being of a given type of tasks, the method being executed by a server. The method comprises: receiving, by the server, a plurality of results of the task having been submitted by a plurality of human assessors of the crowd-sourced environment; receiving, by the server, a quality score for each human assessor of the plurality of human assessors, the quality score being indicative of a reliability of the human assessor; generating, by the server, a plurality of vector representations comprising a vector representation for each of the results of the plurality of results; mapping, by the server, the plurality of vector representations into a vector space; clustering, by the server, the plurality of vector representations into at least a first cluster and a second cluster, the first cluster including a first subset of the plurality of vector representations and the second cluster including a second subset of the plurality of vector representations; executing, by the server, a machine learning (MLA) algorithm configured to generate a first confidence parameter and a second confidence parameter, the first confidence parameter corresponding to a probability of the first subset having a vector representation of a correct result of the task, the first confidence parameter being generated based on one or more quality scores associated with the first subset of the plurality of vector representations;

and the second confidence parameter corresponding to a probability of the second subset having the vector representation of the correct result of the task, the second confidence parameter being generated based on one or more quality scores associated with the second subset of the plurality of vector representations; in response to a given one of the first confidence parameter and the second confidence parameter meeting a predetermined condition, generating, by the server, an aggregated vector representation based on an associated one of the first subset of the plurality of vector representations and the second subset of the plurality of vector representations; and selecting, by the server, the aggregated vector representation as the result of the task.

In some non-limiting embodiments, the given type of task is one of a translation task and a speech-to-text conversion task.

In some non-limiting embodiments, the result is being represented in a textual form, and wherein the generating the plurality of vector representations comprises generating a word embedding for each of the plurality of the textual form, using one of a Word2Vec model, a continuous bag-of-words model, and a continuous skip-gram model.

In some non-limiting embodiments, the clustering the plurality of vector representations is executed by one of a k-means clustering algorithm, a centroid-based clustering algorithm, a distribution-based clustering algorithm, and a density-based clustering algorithm.

In some non-limiting embodiments, the quality score of a given human assessor is based on an error rate of the given human assessor in executing the given type of tasks.

In some non-limiting embodiments, the MLA is a Dawid-Skene model algorithm configured to generate the first confidence parameter based on the error rates associated with a first subset of the plurality of human assessors associated with the first subset of the plurality of vector representations; and the second confidence parameter based on the error rates associated with a second subset of the plurality of human assessors associated with the second subset of the plurality of vector representations.

In some non-limiting embodiments, the predetermined condition comprises a highest one of the first confidence parameter and the second confidence parameter.

In some non-limiting embodiments, the generating the aggregated vector representation comprises selecting a given vector representation corresponding to a medoid of the first subset of the plurality of vector representations.

In some non-limiting embodiments, the generating the aggregated vector representation comprises: generating a first given vector representation corresponding to a centroid of the first subset of the plurality of vector representations; selecting from the first subset of the plurality of vector representations a second given vector representation corresponding to a most similar vector representation to the centroid as the aggregated vector representation.

In some non-limiting embodiments, the selecting the aggregated vector representation comprises inputting the aggregated vector representation into a vector-to-text routine to generate a single result.

In accordance with another broad aspect of the present technology, there is provided a system for determining a result for a task executed in a crowd-sourced environment, the task being of a given type of tasks, the system comprising a server. The server comprises a processor configured to: receive, by the server, a plurality of results of the task having been submitted by a plurality of human assessors of the crowd-sourced environment; receive, by the server, a quality score for each human assessor of the plurality of human assessors, the quality score being indicative of a reliability of the human assessor; generate, by the server, a plurality of vector representations comprising a vector representation for each of the results of the plurality of results; map, by the server, the plurality of vector representations into a vector space; cluster, by the server, the plurality of vector representations into at least a first cluster and a second cluster, the first cluster including a first subset of the plurality of vector representations and the second cluster including a second subset of the plurality of vector representations; execute, by the server, a machine learning (MLA) algorithm configured to generate a first confidence parameter and a second confidence parameter, the first confidence parameter corresponding to a probability of the first subset having a vector representation of a correct result of the task, the first confidence parameter being generated based on one or more quality scores associated with the first subset of the plurality of vector representations; the second confidence parameter corresponding to a probability of the second subset having the vector representation of the correct result of the task, the second confidence parameter being generated based on one or more quality scores associated with the second subset of the plurality of vector representations; in response to a given one of the first confidence parameter and the second confidence parameter meeting a predetermined condition, generate, by the server, an aggregated vector representation based on an associated one of the first subset of the plurality of vector representations and the second subset of the plurality of vector representations; and select, by the server, the aggregated vector representation as the result of the task.

In some non-limiting embodiments, the result is being represented in a textual form, and wherein: to generate the plurality of vector representations, the processor is configured to generate a word embedding for each of the plurality of the textual form, using one of a Word2Vec model, a continuous bag-of-words model, and a continuous skip-gram model.

In some non-limiting embodiments, to cluster the plurality of vector representations, the processor is configured to execute one of a k-means clustering algorithm, a centroid-based clustering algorithm, a distribution-based clustering algorithm, and a density-based clustering algorithm.

In some non-limiting embodiments, the quality score of a given human assessor is based on an error rate of the given human assessor in executing the given type of tasks.

In some non-limiting embodiments, the MLA is a Dawid-Skene model algorithm configured to generate the first confidence parameter based on the error rates associated with a first subset of the plurality of human assessors associated with the first subset of the plurality of vector representations; and the second confidence parameter based on the error rates associated with a second subset of the plurality of human assessors associated with the second subset of the plurality of vector representations.

In some non-limiting embodiments, the predetermined condition comprises a highest one of the first confidence parameter and the second confidence parameter.

In some non-limiting embodiments, to generate the aggregated vector representation, the processor is configured to select a given vector representation corresponding to a medoid of the first subset of the plurality of vector representations.

In some non-limiting embodiments, to generate the aggregated vector representation, the processor is configured to select a most frequent vector representation within the first subset of the plurality of vector representations.

In some non-limiting embodiments, to generate the aggregated vector representation, the processor is configured to: generate a first given vector representation corresponding to a centroid of the first subset of the plurality of vector representations; select from the first subset of the plurality of vector representations a second given vector representation corresponding to a most similar vector representation to the centroid as the aggregated vector representation.

Additional and/or alternative features, aspects and advantages of implementations of the present technology will become apparent from the following description, the accompanying drawings and the appended claims.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
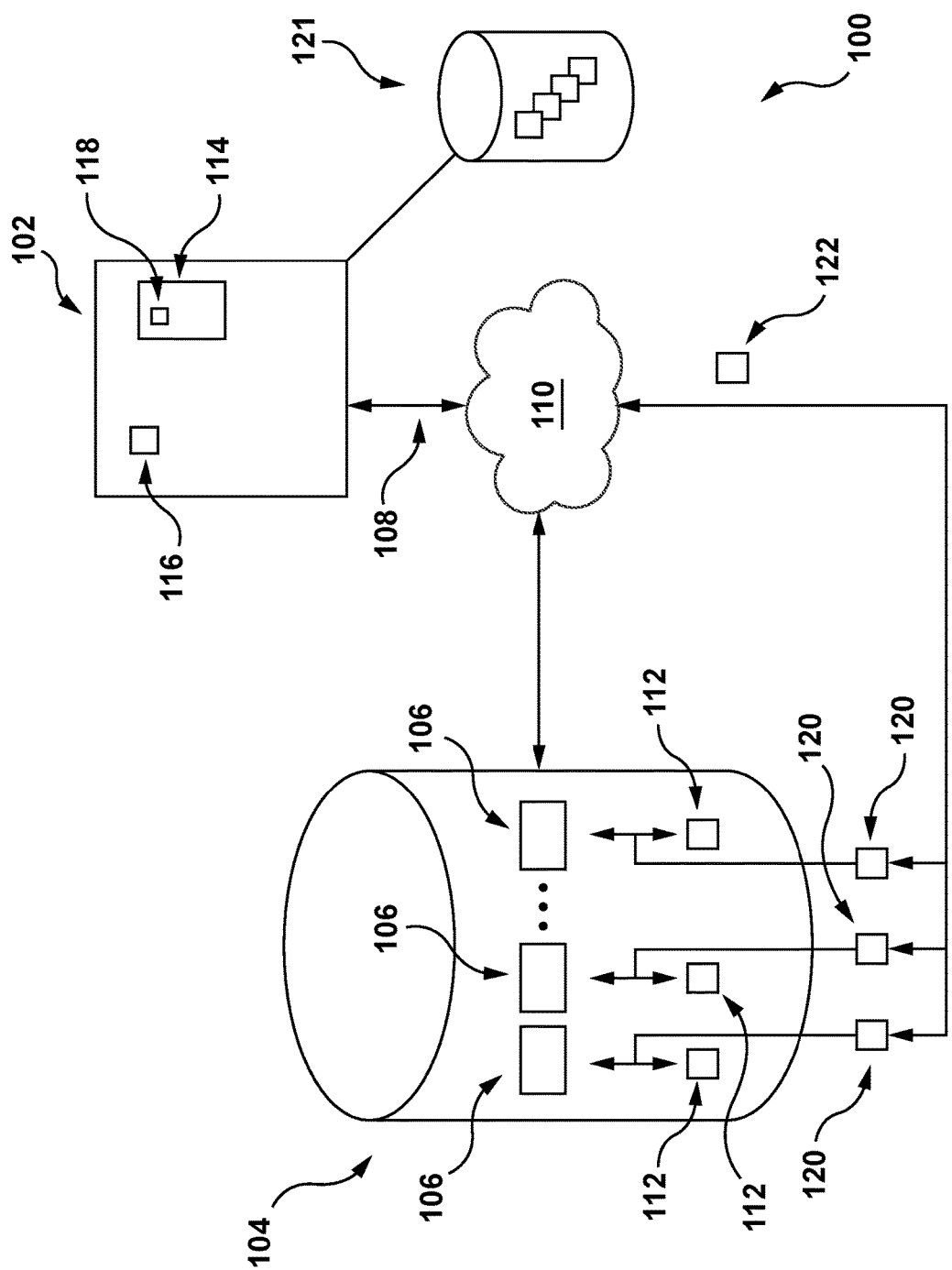
FIG. 1 depicts a schematic diagram of a system implemented in accordance with non-limiting embodiments of the present technology.

Referring to FIG. 1, there is shown a schematic diagram of a system 100, the system 100 being suitable for implementing non-limiting embodiments of the present technology. It is to be expressly understood that the system 100 is depicted merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope. Furthermore, as an aid to understanding, the following description may describe relatively simplified implementations of the present technology. As persons skilled in the art would understand, various implementations of the present technology may be of greater complexity.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labelled as a "processor" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some non-limiting embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

With these fundamentals in place, we will now consider some non-limiting examples to illustrate various implementations of aspects of the present technology.

The system 100 comprises a server 102 and a database 104 accessible by the server 102.

As schematically shown in FIG. 1, the database 104 comprises an indication of identities of a plurality of human assessors 106, who have indicated their availability for completing at least one type of a crowd-sourced task and/or who have completed at least one crowd-sourced task in the past and/or registered for completing at least one type of the crowd-sourced task.

In some non-limiting embodiments of the present technology, the database 104 is under control and/or management of a provider of crow-sourced services, such as Yandex LLC of Lev Tolstoy Street, No. 16, Moscow, 119021, Russia. In alternative non-limiting embodiments, the database 104 can be operated by a different entity.

The implementation of the database 104 is not particularly limited and, as such, the database 104 could be implemented using any suitable known technology, as long as the functionality described in this specification is provided for. In accordance with the non-limiting embodiments of the present technology, the database 104 comprises (or has access to) a communication interface (not depicted), for enabling two-way communication with a communication network 110.

In some non-limiting embodiments of the present technology, the communication network 110 can be implemented as the Internet. In other non-limiting embodiments of the present technology, the communication network 110 can be implemented differently, such as any wide-area communication network, local area communications network, a private communications network and the like.

It is contemplated that the database 104 can be stored at least in part at the server 102 and/or in any other one or more locations and/or could be managed at least in part by the server 102. In accordance with the non-limiting embodiments of the present technology, the database 104 comprises sufficient information associated with the identity of at least some of the plurality of human assessors 106 to allow an entity that has access to the database 104, such as the server 102, to assign and transmit one or more tasks to be completed by the one or more human assessors 106.

In accordance with the non-limiting embodiments of the present technology, the database 104 stores a quality score 112 associated with each of the human assessors 106. The quality score 112 of each given human assessor 106 indicates a reliability of a given result of a task completed by the given human assessor 106, or, in other words, an error rate of the given human assessor 106.

How the quality scores 112 of the human assessors 106 are determined is not limited. For example, the quality scores 112 may be determined based on a first plurality of "honeypot tasks" completed by each of the human assessors 106. In the present specification, the term "honeypot tasks" means a task the correct result of which is known prior to the task being submitted to the given human assessor 106 being tested/assessed for the quality score associated therewith, for completion thereof, which correct result is not provided to the one or more given human assessor 106 being assessed.

The results of the first plurality of honeypot tasks provided by the human assessors 106 are recorded in the database 104 in suitable a data structure (not depicted). For each given human assessor 106, a percentage of the first plurality of honeypot tasks that the given human assessor 106 completes correctly is calculated and recorded in the database 104 as the quality score 112 of the given human assessor 106. For example, if a given human assessor 106 completes twenty honeypot tasks and provides a result matching the corresponding known correct result to eighteen of the twenty honeypot tasks, then the quality score 112 of the given human assessor 106 is determined to be $18/20=0.9$ (90%). Needless to say, the quality score may be expressed in a number of different formats.

In some non-limiting embodiments of the present technology, the quality scores 112 may be determined based on a statistical analysis of previously completed tasks and checks executed by a trusted human assessor.

At any given time, the plurality of human assessors 106 may comprise a different number of human assessors 106, such as fifty human assessors 106, that are available to complete tasks and that have corresponding quality scores 112 that are between 0% and 100%. The plurality of human assessors 106 could include more or fewer human assessors 106.

The server 102 can be implemented as a conventional computer server. In an example of a non-limiting embodiment of the present technology, the server 102 can be implemented as a Dell™ PowerEdge™ Server running the Microsoft™ Windows Server™ operating system. Needless to say, the server 102 can be implemented in any other suitable hardware and/or software and/or firmware or a combination thereof. In the depicted non-limiting embodiment of the present technology, the server 102 is a single server. In alternative non-limiting embodiments of the present technology, the functionality of the server 102 may be distributed and may be implemented via multiple servers.

The server 102 comprises a communication interface (not depicted) for enabling two-way communication with the communication network 110 via a communication link 108.

How the communication link 108 is implemented is not particularly limited and depends on how the server 102 is implemented. For example, the communication link 108 can be implemented as a wireless communication link (such as, but not limited to, a 3G communications network link, a 4G communications network link, a Wireless Fidelity, or WiFi®, for short, Bluetooth®, or the like) or as a wired communication link (such as an Ethernet based connection).

It should be expressly understood that implementations for the server 102, the communication link 108 and the communication network 110 are provided for illustration purposes only. As such, those skilled in the art will easily appreciate other specific implementational details for the server 102, the communication link 108, and the communication network 110. As such, by no means the examples provided hereinabove are meant to limit the scope of the present technology.

The server 102 comprises a server memory 114, which comprises one or more storage media and generally stores computer-executable program instructions executable by a server processor 116. By way of example, the server memory 114 may be implemented as a tangible computer-readable storage medium including Read-Only Memory (ROM) and/or Random-Access Memory (RAM). The server memory 114 may also include one or more fixed storage devices in the form of, by way of example, hard disk drives (HDDs), solid-state drives (SSDs), and flash-memory cards.

In some non-limiting embodiments of the present technology, the server 102 can be operated by the same entity that operates the database 104. In alternative non-limiting embodiments, the server 102 can be operated by an entity different from the one that operates the database 104.

In some non-limiting embodiments of the present technology, the server 102 is configured to execute a crowd-sourcing application 118. For example, the crowd-sourcing application 118 may be implemented as a crowd-sourcing platform such as Yandex.Toloka™ crowd-sourcing platform, or other proprietary or commercial crowd-sourcing platform.

To that end, the server 102 is communicatively coupled to a task database 121. In alternative non-limiting embodiments, the task database 121 may be communicatively coupled to the server 102 via the communication network 110. Although the task database 121 is illustrated schematically herein as a single entity, it is contemplated that the task database 121 may be configured in a distributed manner.

The task database 121 is populated with a plurality of human intelligence tasks (HITs, hereinafter "tasks") (not separately numbered). How the task database 121 is populated with the plurality of tasks is not limited. Generally speaking, one or more task requestors (not shown) may submit one or more tasks to be completed in the task database 121. In some non-limiting embodiments of the present technology, the one or more task requestors may specify the type of assessors the task is destined to, and/or a budget to be allocated to each human assessor 106 providing a correct result.

In some non-limiting embodiments of the present technology, a given task of the plurality of tasks could include a translation task. For example, the translation task corresponds to a task in which the human assessors 106 are asked to input a correct translation of a sentence in a source language (such as French) into a target language (such as English).

In some non-limiting embodiments of the present technology, a given task of the plurality of tasks could include a speech-to-text conversion task. For example, the speech-to-text conversion task may be the human assessors 106 being asked to input a correct textual representation of a recorded spoken utterance.

In some non-limiting embodiments of the present technology, a given task of the plurality of tasks could include an optical character recognition (OCR) task. For example, the OCR task corresponds to a task in which the human assessors 106 are asked to determine a correct textual representation of a text provided on a scanned image.

In accordance with the non-limiting embodiments of the present technology, the crowd-sourcing application 118 is configured to assign a given task to at least a subset of the plurality of human assessors 106, which have indicated their availability in the database 104.

The server 102 is configured to communicate with various entities via the communication network 110. Examples of the various entities include the database 104, respective electronic devices 120 of the human assessors 106, and other devices that may be coupled to the communication network 110. Accordingly, the crowd-sourcing application 118 is configured to retrieve the given task from the task database 121 and send the given task to a respective electronic device 120 used by the plurality of human assessors 106 to complete the given task, via the communication network 110 for example.

It is contemplated that any suitable file transfer technology and/or medium could be used for this purpose. It is also contemplated that the task could be submitted to the plurality of human assessors 106 via any other suitable method, such as by making the task remotely available to the plurality of human assessors 106.

In accordance with the non-limiting embodiments of the present technology, the server 102 is configured to receive a set of results of the task that has been completed by the plurality of human assessors 106. In accordance with the non-limiting embodiments of the present technology, the set of results could be received by the server 102 in one or more data packets 122 over the communication network 110 for example. It is contemplated that any other suitable data transfer means could be used.

Crowd-Sourcing Application 118

Figure 2:
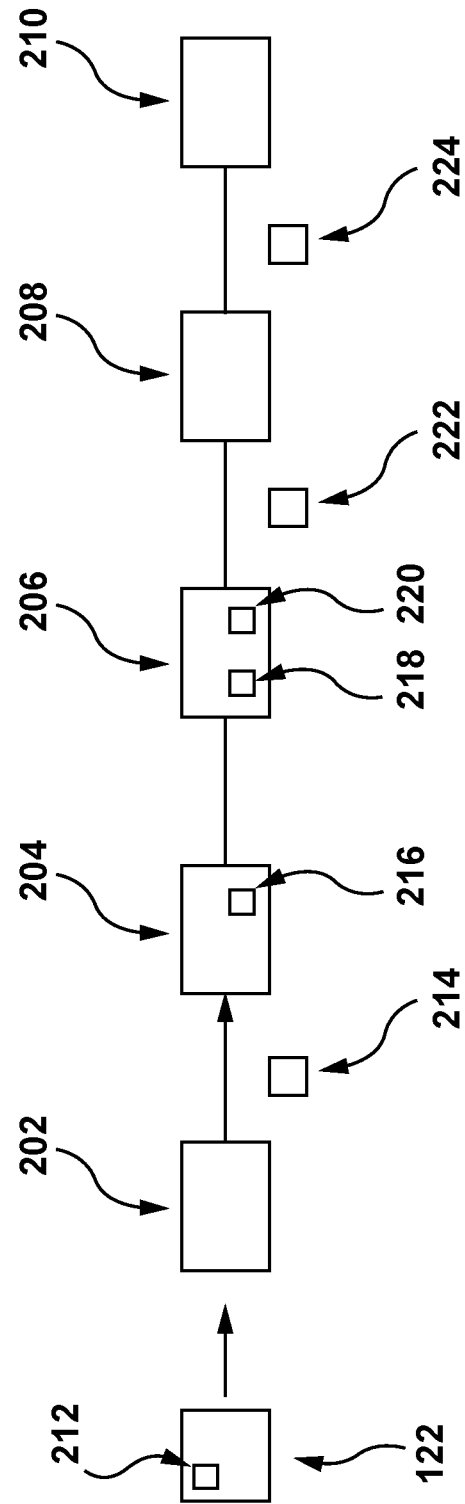
FIG. 2 depicts a schematic diagram of a process for determining a result for a task executed in a crowd-sourced environment.

With reference to FIG. 2, there is depicted a schematic diagram of a process for determining a result for a task executed in a crowd-sourced environment. The process for determining the result is executed by the crowd-sourcing application 118 (see FIG. 1) implemented in accordance with a non-limiting embodiment of the present technology. The crowd-sourcing application 118 executes (or otherwise has access to): a receiving routine 202, a mapping routine 204, a clustering routine 206, an aggregating routine 208 and a selection routine 210.

In the context of the present specification, the term "routine" refers to a subset of the computer executable program instructions of the crowd-sourcing application 118 that is executable by the server processor 116 (the receiving routine 202, the mapping routine 204, the clustering routine 206, the aggregating routine 208 and the selection routine 210), For the avoidance of any doubt, it should be expressly understood that the receiving routine 202, the mapping routine 204, the clustering routine 206, the aggregating routine 208 and the selection routine 210 are illustrated herein as separate entities for ease of explanation of the processes executed by the crowd-sourcing application 118. It is contemplated that some or all of the receiving routine 202, the mapping routine 204, the clustering routine 206, the aggregating routine 208 and the selection routine 210 may be implemented as one or more combined routines.

For ease of understanding the present technology, functionality of each of the receiving routine 202, the mapping routine 204, the clustering routine 206, the aggregating routine 208 and the selection routine 210, as well as data and/or information processed or stored therein are described below.

Receiving Routine 202

The receiving routine 202 is configured to receive a plurality of results 212 from the respective electronic device 120 used by a given one of the plurality of human assessors 106 submitting a result to the task assigned to the given one of the plurality of human assessors 106, via a data packet 122. Needless to say, although a single data packet 122 is shown, this is merely for ease of understanding, and it should be understood that a plurality of data packets each containing a given one of the result may be received by the receiving routine 202. In some non-limiting embodiments of the present technology, a given result of the plurality of results 212 may be a word, a phrase, or a sentence.

For example, if the task is an OCR task, the plurality of results 212 comprises textual answers inputted by the human assessors 106. On the other hand, if the task is a speech-to-text conversion task, the plurality of results 212 comprises textual answers inputted by the human assessors 106 corresponding to the recorded spoken utterance. Finally, if the task is a translation task, the plurality of results comprises textual answers in a target language inputted by the human assessors 106 corresponding to a text in a source language.

Needless to say, although only a single instance of the data packet 122 is shown, it should be understood that this is done merely for ease of understanding, and the receiving routine 202 is configured to receive more than a single data packet, such as one from each respective electronic device 120.

In some non-limiting embodiments of the present technology, each result of the plurality of results 212 comprises an indication of the human assessor 106 that generated the result. The receiving routine 202 is then configured to access the database 104 to retrieve the quality score 112 associated with each human assessors 106 and associate it with the received result from that specific one of the plurality of human assessors 106.

The receiving routine 202 is further configured to transmit a data packet 214 to the mapping routine 204. The data packet 214 comprises (i) the plurality of results 212 and (ii) the quality score 112 associated with the plurality of results 212.

Mapping Routine 204

In response to receiving the data packet 214, the mapping routine 204 is configured to execute the following functions.

Firstly, the mapping routine 204 is configured to execute a vector generating algorithm 216 that is configured to generate a vector representation of each result of the plurality of results 212.

How the vector producing algorithm 216 is implemented is well known in the art, and will not be described in detail herein. Suffice it to say, that the vector producing algorithm 216 is configured to generate a word embedding for each of the plurality of results 212, using one of a Word2Vec model, a continuous bag-of-words model, and a continuous skip-gram model, and the like.

It should be expressly understood that the plurality of results 212 may include one or more recurring results, which would result in a same vector representation. For example, if two results correspond to "ABC", both results will have the same vector representation.

Upon generating the plurality of vector representations, the vector producing algorithm 216 is further configured to map the plurality of vector representations into a multi-dimensional vector space (described in detail below). How the multi-dimensional vector space is implemented is not limited, and will depend on the dimensionality of the plurality of vector representations.

Figure 3:
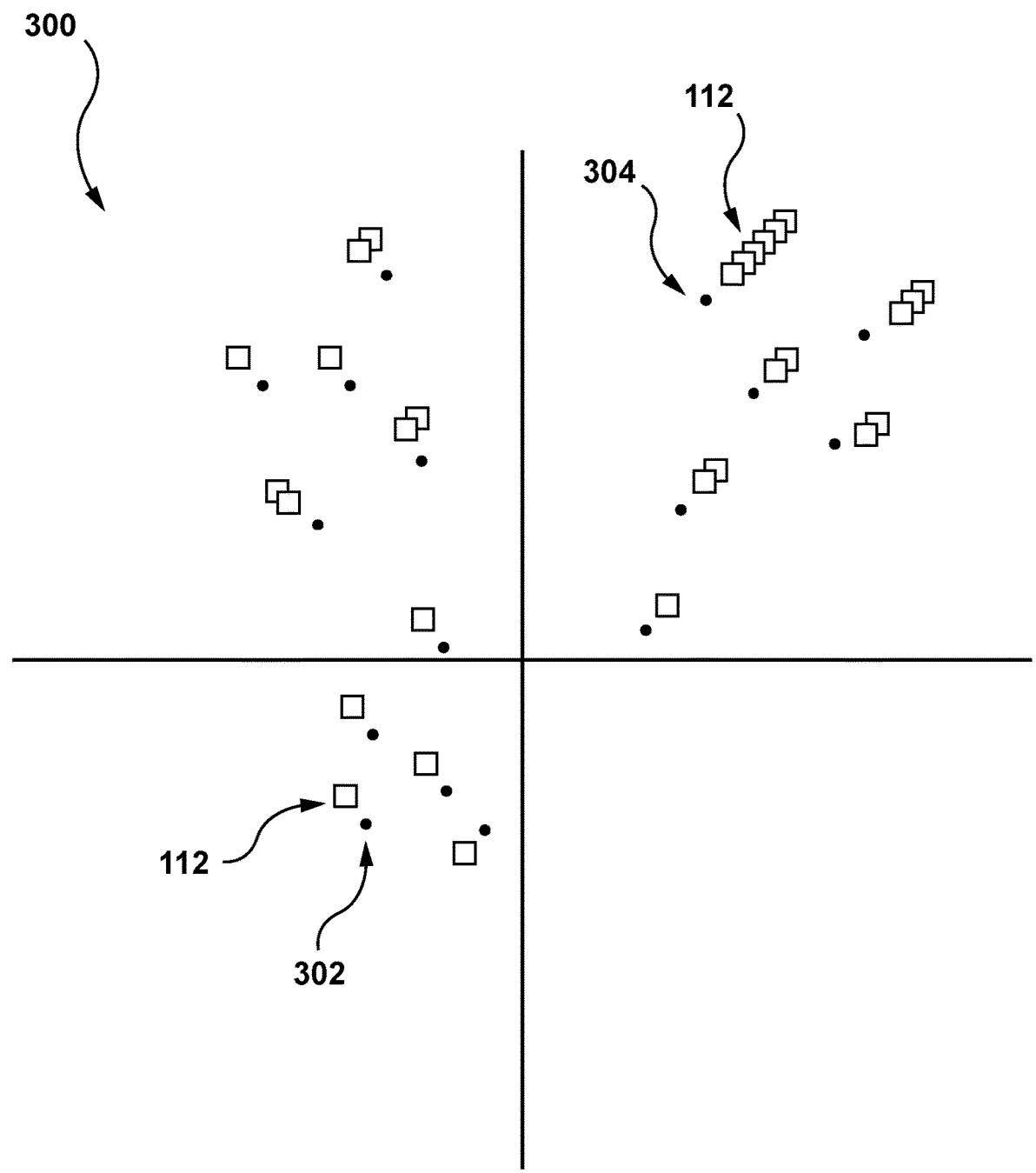
FIG. 3 depicts a schematic illustration of a plurality of vector representations of results mapped into a vector space, executed as part of the process of FIG. 2.

With reference to FIG. 3, a schematic illustration of the plurality of vector representations being mapped into a vector space 300 by the mapping routine 204 is depicted.

As illustrated the plurality of vector representations (illustrated as dots) is mapped into the vector space 300. Although the vector space 300 is illustrated as a two-dimensional space, this is merely done for ease of presentation, and it should be understood that the vector space 300 may be implemented as an n-dimensional space.

The mapping routine 204 is further configured to associate each vector representation with the associated quality score 112. For example, the mapping routine 204 may be configured to generate a list (not shown) in which each vector representation (or an indication thereof) is associated with a respective quality score. For ease of reference, within FIG. 3, each quality score 112 (illustrated as squares) is associated with a vector representation. It should be expressly understood that although it appears as if the quality scores 112 were also mapped within the vector space 300, it is to be understood that this is merely done for ease of illustration.

Now, within the vector space 300, there is a provided a first vector representation 302 which is associated with one quality score 112. The quality score 112 associated with the first vector representation 302 corresponds to the quality score 112 of the human assessor 106 who submitted the result that corresponds to the first vector representation 302.

Similarly, there is provided a second vector representation 304 within the vector space 300, which is associated with six quality scores 112. In other words, six results provided by the plurality of human assessors 106 have the same answer, and as such is represented as a single vector representation but associated with each quality score 112 of the six human assessors 106 that submitted the same result.

Clustering Routine 206

The clustering routine 206 is configured access the vector space 300 to execute the following functions.

First, the clustering routine 206 is configured to cluster the plurality of vector representations into a plurality of clusters, where each similar vector representations is clustered into a same cluster.

The manner in which the clustering algorithm 218 is implemented is not limited, and may be one of a k-means clustering algorithm, a centroid-based clustering algorithm, a distribution-based clustering algorithm, a density-based clustering algorithm, and the like.

Figure 4:
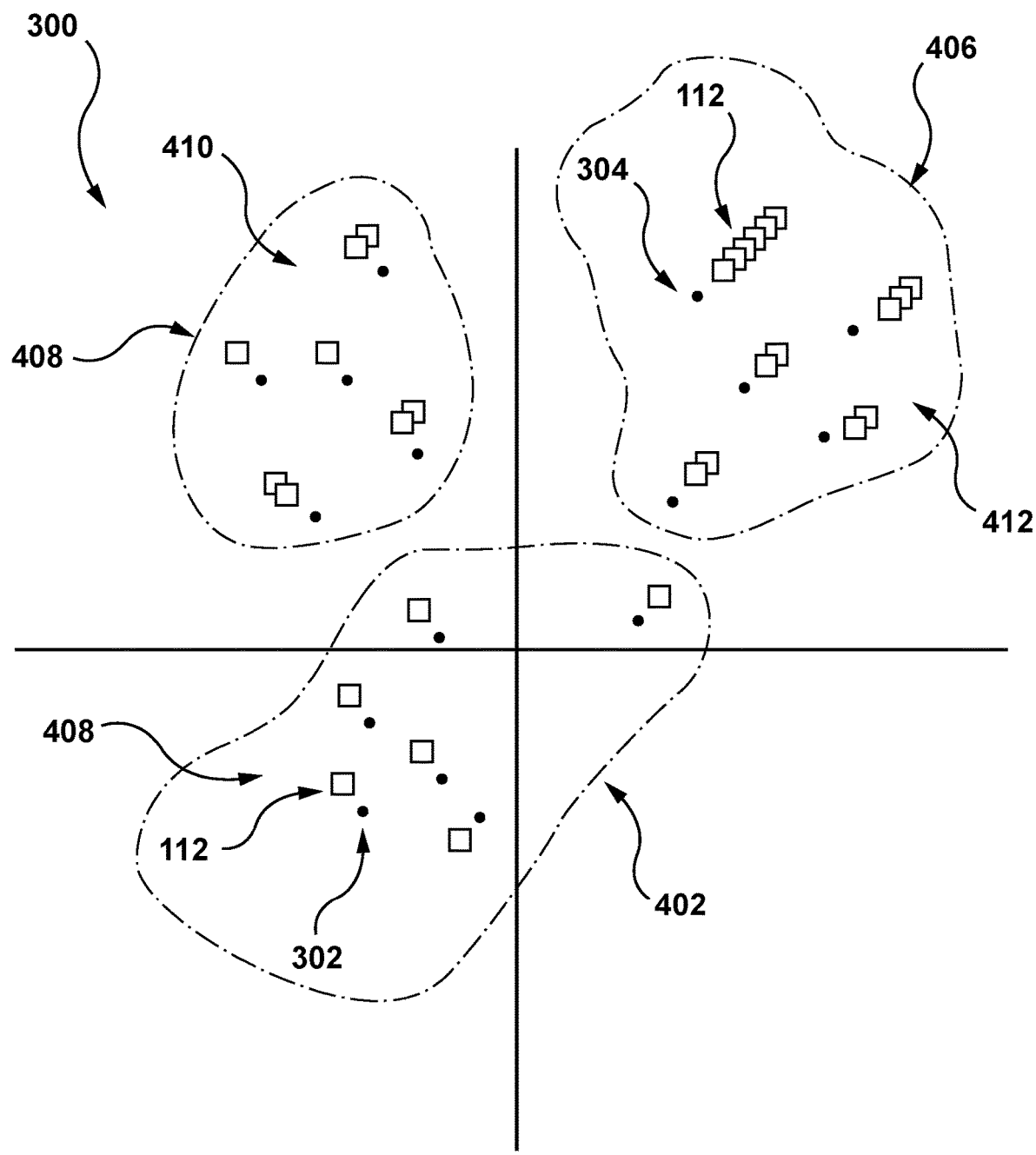
FIG. 4 depicts a schematic illustration of the plurality of vector representations of FIG. 3 being clustered, as part of the process of FIG. 2.

With reference to FIG. 4, a schematic illustration of the plurality of vector representations being clustered by the clustering algorithm 218 is depicted.

The plurality of vector representations has been clustered, by the clustering algorithm 218, into three clusters, namely a first cluster 402, a second cluster 404 and a third cluster 406. Needless to say, it is contemplated that the clustering algorithm 218 clusters the plurality of vector representations into more or less than three clusters.

The first cluster 402 includes a first subset 408 of the plurality of vector representations. More precisely, the first subset 408 comprises 6 vector representations (including the first vector representation 302) of results that have been submitted by 6 human assessors 106.

The second cluster 404 includes a second subset 410 of the plurality of vector representations. More precisely, the second subset 410 comprises 5 vector representations of results that have been submitted by 8 human assessors 106.

Finally, the third cluster 406 includes a third subset 412 of the plurality of vector representations. More precisely, the third subset 412 comprises 5 vector representations (including the second vector representation 304) of results that have been submitted by 15 human assessors 106.

Returning to FIG. 2, having clustered the plurality of vector representations, the clustering routine 206 is further configured to execute a machine learning algorithm (MLA) 220 trained to calculate a confidence parameter for each of the first cluster 402, the second cluster 404 and the third cluster 406. In some non-limiting embodiments of the present technology, the confidence parameter corresponds to a probability of a given cluster (the first cluster 402, the second cluster 404 and the third cluster 406) including a vector representation of a correct result of the task.

Taking the third cluster 406 as an example, the MLA 220 is configured to determine the probability of the third subset 412 including the vector representation of the correct result to the task based on the 8 quality scores associated with the third subset 412.

How the MLA 220 is implemented is not limited. Recalling that the quality score 112 is indicative of the error rate associated with a given human assessor, the MLA 220 may be implemented as a Dawid and Skene model based algorithm to determine the confidence parameter based on the quality scores 112 of each vector representations included in each of the first cluster 402, the second cluster 404 and the third cluster 406. How the confidence parameter is implemented is not limited, and may for example be implemented as a percentage value, a range value (i.e. from 1 to 100).

Having determined a first confidence parameter associated with the first cluster 402, a second confidence parameter associated with the second cluster 404 and a third confidence parameter associated with the third cluster 406, the clustering routine 206 is configured to transmit a data packet 222 to the aggregating routine 208. The data packet 222 comprises the first confidence parameter, the second confidence parameter and the third confidence parameter.

Aggregating Routine 208

In response to receiving the data packet 222, the aggregating routine 208 is configured to execute the following.

Firstly, the aggregating routine 208 is configured to select one of the first confidence parameter, the second confidence parameter and the third confidence parameter meeting a predetermined condition. In some non-limiting embodiments of the present technology, meeting the predetermined condition corresponds to determining a highest one of the first confidence parameter, the second confidence parameter, and the third confidence parameter.

Let us assume for example that the third confidence parameter, which is associated with the third cluster 406, corresponds to the highest confidence parameter, meaning that the third cluster 406 is determined to have the highest probability of comprising a vector representation of the correct result to the task.

The aggregating routine 208 is further configured to generate an aggregated vector representation of the third subset 412. In some non-limiting embodiments of the present technology, the aggregated vector representation corresponds to a vector representation of a correct answer to the task. How the aggregated vector representation is determined is not limited, and will be explained below with reference to a number of examples.

First Example

Figure 5:
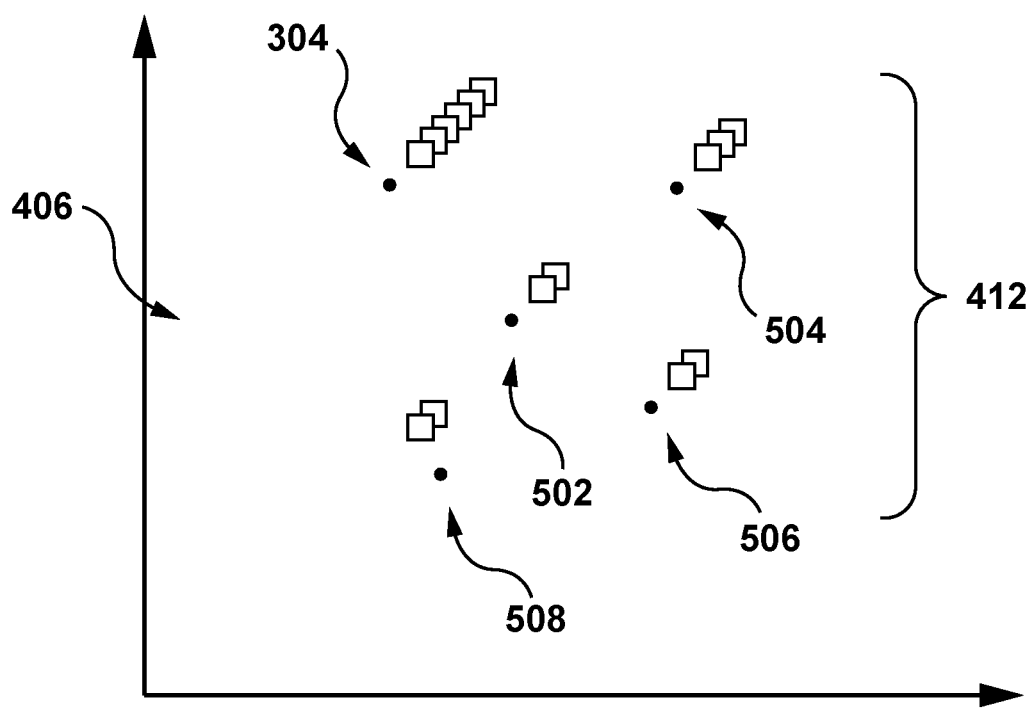
FIG. 5 depicts a schematic illustration of a first example of a process for determining an aggregated vector representation, executed as part of the process of FIG. 2.

With reference to FIG. 5, a schematic illustration of a first example of a process for determining an aggregated vector representation of the third subset 412 is illustrated.

As illustrated, the third subset 412 comprises the second vector representation 304, a third vector representation 502, a fourth vector representation 504, a fifth vector representation 506 and a sixth vector representation 508.

In some non-limiting embodiments of the present technology, the aggregated vector representation corresponds to a medoid of the third subset 412. In other words, the aggregating routine 208 is configured to determine which of the vector representation within the third subset 412 has a lowest average dissimilarity to all the remaining vector representation within the third subset 412.

In accordance with the non-limiting embodiments of the present technology, the medoid of the third subset 412 is determined by the aggregating routine 208 executing the following formula/function:

$$x_{medoid} = \mathrm{argmin}_{y \in \{x1, x2, \ldots, xn\}} \sum_{i=1}^{n} d(y, x_i) \quad \text{Formula 1}$$

where $x_1, x_2, \ldots, x_n$ corresponds to the second vector representation 304, the third vector representation 502, the fourth vector representation 504, the fifth vector representation 506 and the sixth vector representation 508 in the vector space 300 with a distance function d.

Second Example

Figure 6:
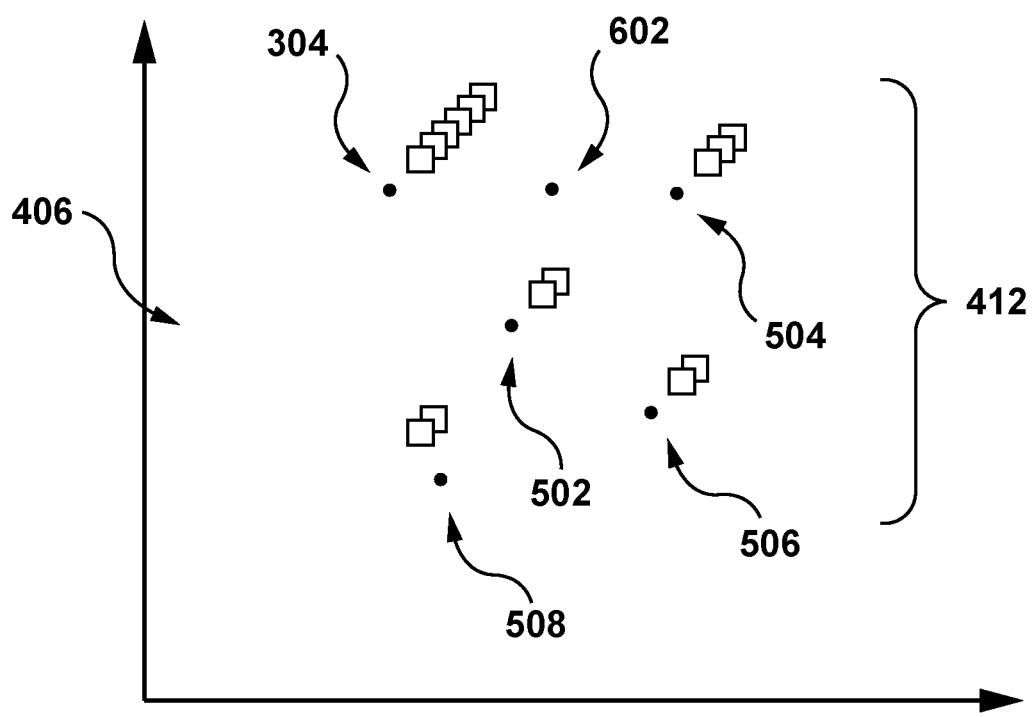
FIG. 6 depicts a schematic illustration of a second example of a process for determining an aggregated vector representation, executed as part of the process of FIG. 2.

With reference to FIG. 6, a schematic illustration of a second example of a process for determining an aggregated vector representation of the third subset 412 is illustrated.

In some non-limiting embodiments of the present technology, the aggregated vector representation corresponds to the vector representation that is most similar to a centroid of the third subset 412.

How the centroid is determined is not limited. In some non-limiting embodiments of the present technology, the centroid may, for example, be determined using the following formula/function:

$$\text{Centroid} = \text{average } (x), \text{average } (y), \text{average } (z) \ldots \text{average } (n) \quad \text{Formula 2}$$

Using Formula 2, the centroid is a point in the vector space 300 that corresponds to the average value of each dimension (x, y, z, ... n) of the second vector representation 304, the third vector representation 502, the fourth vector representation 504, the fifth vector representation 506 and the sixth vector representation 508.

Needless to say, it is contemplated that the centroid may be determined not using the average value of each dimensions of the vector representations within the third subset 412 (the second vector representation 304, the third vector representation 502, the fourth vector representation 504, the fifth vector representation 506 and the sixth vector representation 508). For example, the centroid may rather be determined by using the mathematical middle (the mean of the extrema) in each dimension (x, y, z, ... n) of the second vector representation 304, the third vector representation 502, the fourth vector representation 504, the fifth vector representation 506 and the sixth vector representation 508.

Although in the above example, the centroid is determined without regard to the actual number of same results having the same vector representations (such as the second vector representation 304 corresponding to six results submitted by six human assessors 106), it is not limited as such.

Indeed, it is contemplated that the average value (or the mean of the extrema) of each dimension be determined by taking into account the each and every single vector representation of each result submitted. In other words, the centroid can be determined based on (i) 6 vector representations corresponding to the second vector representation 304; (ii) 2 vector representations corresponding to the third vector representation 502; (iii) 3 vector representations corresponding to the fourth vector representation 504; (iv) 2 vector representations corresponding to the fifth vector representation 506; and (v) 2 vector representations corresponding to the sixth vector representation 508.

Let us assume for example that the aggregating routine 208 has identified a centroid 602, as shown in FIG. 6. The aggregating routine 208 is then configured to determine which of the vector representations within the third subset 412 (the second vector representation 304, the third vector representation 502, the fourth vector representation 504, the fifth vector representation 506 and the sixth vector representation 508) is most similar to the centroid 602.

How the vector representation most similar to the centroid 602 is determined is not limited. For example, the aggregating routine 208 is configured to determine a cosine similarity between the centroid 602 and the vector representations within the third subset 412 (the second vector representation 304, the third vector representation 502, the fourth vector representation 504, the fifth vector representation 506 and the sixth vector representation 508), and select the vector representation having a highest cosine similarity.

Third Example

In some non-limiting embodiments of the present technology, the aggregated vector representation corresponds to the vector representation having a majority vote within the third subset 412.

Figure 7:
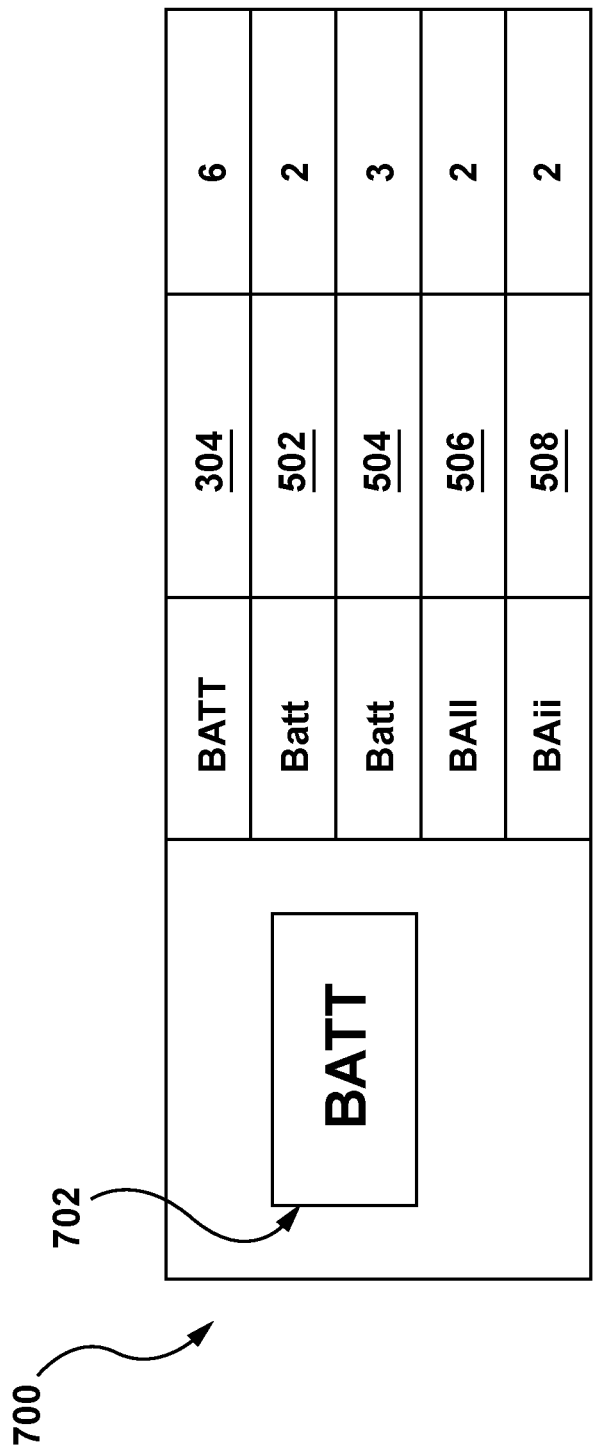
FIG. 7 depicts a schematic illustration of a third example of a process for determining an aggregated vector representation, executed as part of the process of FIG. 2.

Taking a look at FIG. 7, a schematic illustration of a third example of a process for determining an aggregated vector representation is illustrated. FIG. 7 illustrates a table 700 showing each of the vector representations within the third subset 412 with the associated number of results is depicted.

Let us assume for example that the task, for which the plurality of results 212 has been received, is an OCR task, in which the human assessors 106 were asked to input the text of a text included in a scanned image 702 (which corresponds to "BATT").

Within the third subset 412, six human assessors 106 inputted "BATT" as the result, which corresponds to the second vector representation 304. Two human assessors 106 inputted "Batt" as the result, which corresponds to the third vector representation 502. Three human assessors 106 inputted "batt" as the result, which corresponds to the fourth vector representation 504. Two human assessors 106 inputted "BAII" as the result, which corresponds to the fifth vector representation 506. Finally, two human assessors 106 inputted "BAii" as the result, which corresponds to the sixth vector representation 508.

The aggregating routine 208 is then configured to select the vector representations that is most frequent within the third subset 412, or in other words, has a majority vote within the third subset 412, namely "BATT" (which corresponds to the second vector representation 304), as the aggregated vector representation.

Returning now to FIG. 2, having determined the aggregated vector representation of the third subset 412, the aggregating routine 208 is further configured to transmit a data packet 224 to the selection routine 210, which comprises the aggregated vector representation.

Selection Routine 210

In response to receiving the data packet 224, the selection routine 210 is configured to convert the aggregated vector representation into a textual format.

For example, assuming that the second vector representation 304 has been selected as the aggregated vector representation, the selection routine 210 is configured to execute a vector-to-text routine (not shown) to generate the corresponding result, namely "BATT".

The selection routine 210 is then configured to select the result "BATT" as the correct result to the task.

In some non-limiting embodiments of the present technology, the selection routine 210 is further configured to calculate and issue rewards to the human assessors 106 who has answered "BATT".

In some non-limiting embodiments of the present technology, the selection routine 210 is further configured to access the database 104 (see FIG. 1) and increase the quality scores 112 of the human assessors 106 that have submitted "BATT" as the result.

In some non-limiting embodiments of the present technology, the selection routine 210 is further configured to access the database 104 (see FIG. 1) and decrease the quality scores 112 of the human assessors 106 that have provided a result that did not correspond to a vector representation within the third subset 412.

The various non-limiting embodiments of the present technology may allow the generating of the correct result to a task to which the correct answer is unknown.

Figure 8:
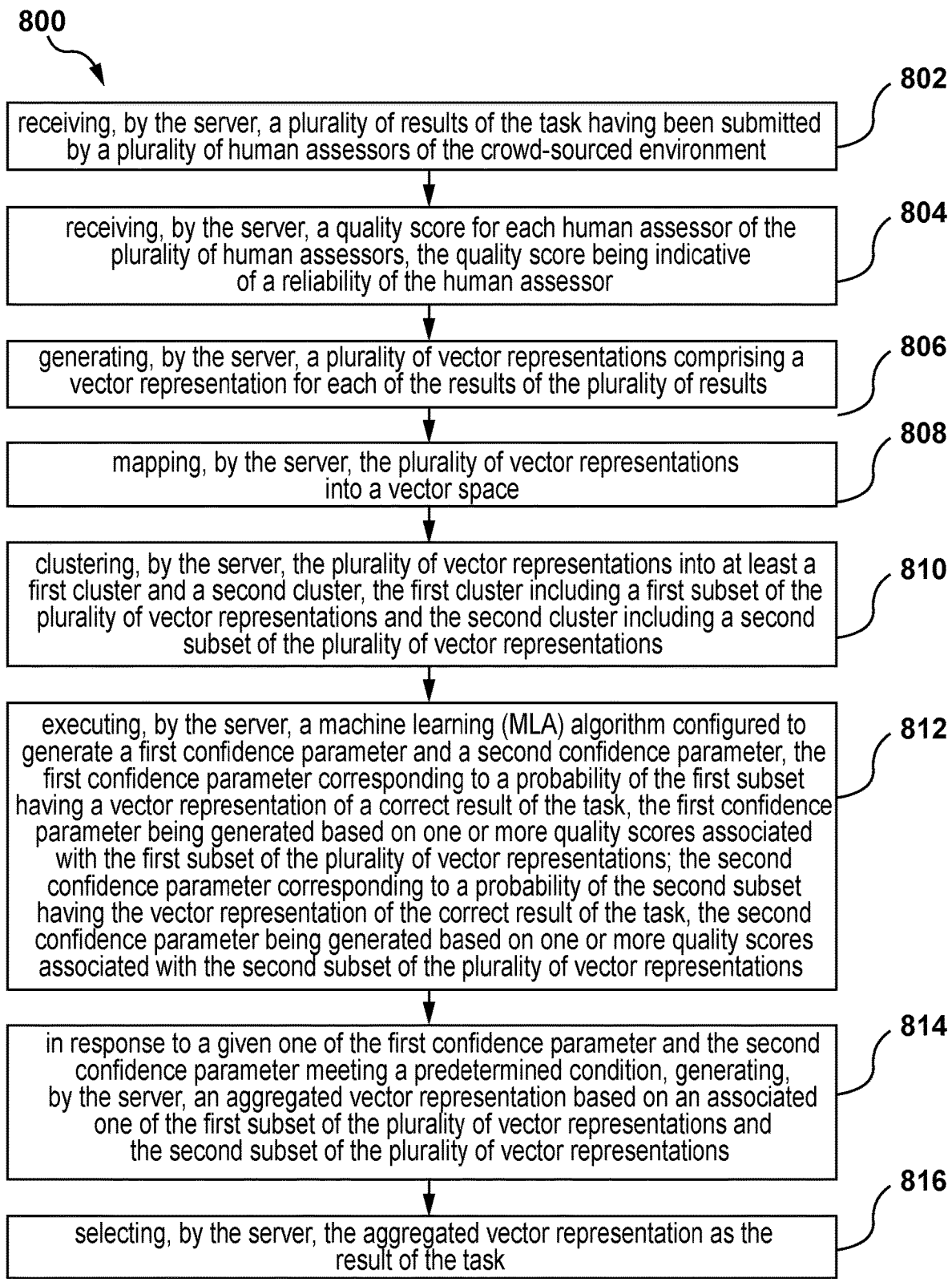
FIG. 8 depicts a block diagram of a flow chart of a method for determining a result of a task executed in a crowd-sourced environment.

Given the architecture and examples provided herein above, it is possible to execute a computer-implemented method for determining a result for a task executed in a crowd-sourced environment. With reference to FIG. 8, there is provided a flow chart of a method 800, the method 800 being executable in accordance with non-limiting embodiments of the present technology. The method 800 can be executed by the server 102.

Step 802: Receiving, by the Server, a Plurality of Results of the Task Having been Submitted by a Plurality of Human Assessors of the Crowd-Sourced Environment The method 800 starts at step 802, where the receiving routine 202 acquires the data packet 122 from the respective electronic device 120 used by each human assessors 106 submitting a result to the task. The data packet 122 comprises a plurality of results 212 to the task that has been submitted by the plurality of human assessors 106. In some non-limiting embodiments of the present technology, each result of the plurality of results 212 may be a word, a phrase, or a sentence.

In some non-limiting embodiments of the present technology, each result of the plurality of results 212 comprises an indication of the human assessor 106 that authored the result.

Step 804: Receiving, by the Server, a Quality Score for Each Human Assessor of the Plurality of Human Assessors, the Quality Score Being Indicative of a Reliability of the Human Assessor At step 804, based on the indication of the human assessors 106 that authored the result, the receiving routine 202 is configured to access the database 104 to retrieve the quality score 112 associated with each human assessor 106 of the plurality of human assessors 106 that authored the plurality of results 212.

The receiving routine 202 is further configured to transmit the data packet 214 to the mapping routine 204. The data packet 214 comprises (i) the plurality of results 212 and (ii) the quality score 112 associated with the plurality of results 212.

Step 806: Generating, by the Server, a Plurality of Vector Representations Comprising a Vector Representation for Each of the Results of the Plurality of Results At step 806, in response to receiving the data packet 214, the mapping routine 204 is configured to execute the following functions.

The mapping routine 204 is configured to execute the vector producing algorithm 216 that is configured to generate a vector representation of each result of the plurality of results 212. It should be expressly understood that the plurality of results 212 may include one or more recurring results, which would result in a same vector representation How the vector producing algorithm 216 is implemented is well known in the art, and will not be described in detail herein. Suffice it to say, the vector producing algorithm 216 is configured to generate a word embedding for each of the plurality of results 212, using one of a Word2Vec model, a continuous bag-of-words model, and a continuous skip-gram model, and the like.

Step 808: Mapping, by the Server, the Plurality of Vector Representations into a Vector Space At step 808, upon generating the plurality of vector representations, the vector producing algorithm 216 is further configured to map the plurality of vector representations into the vector space 300. How the multi-dimensional vector space is implemented is not limited, and will depend on the dimensionality of the plurality of vector representations As illustrated in FIG. 3, the plurality of vector representations (illustrated as dots) is mapped into the vector space 300. Although the vector space 300 is illustrated as a two-dimensional space, this is merely done for ease of presentation, and it should be understood that the vector space 300 may be implemented as an n-dimensional space.

The mapping routine 204 is further configured to associate each vector representation with the associated quality score 112 (illustrated as squares).

Step 810: Clustering, by the Server, the Plurality of Vector Representations Into at Least a First Cluster and a Second Cluster, the First Cluster Including a First Subset of the Plurality of Vector Representations and the Second Cluster Including a Second Subset of the Plurality of Vector Representations At step 810, the clustering routine 206 is configured access the vector space 300 to execute the following functions.

First, the clustering routine 206 is configured to cluster the plurality of vector representations into a plurality of clusters, where each similar vector representations is clustered into a same cluster.

The manner in which the clustering algorithm 218 is implemented is not limited, and may be one of a k-means clustering algorithm, a centroid-based clustering algorithm, a distribution-based clustering algorithm, a density-based clustering algorithm, and the like.

Referring to FIG. 4, plurality of vector representations has been clustered, by the clustering algorithm 218, into three clusters, namely a first cluster 402, a second cluster 404 and a third cluster 406. Needless to say, it is contemplated that the clustering algorithm 218 clusters the plurality of vector representations into more or less than three clusters.

The first cluster 402 includes a first subset 408 of the plurality of vector representations. More precisely, the first subset 408 comprises 6 vector representations (including the first vector representation 302) of results that have been submitted by 6 human assessors 106.

The second cluster 404 includes a second subset 410 of the plurality of vector representations. More precisely, the second subset 410 comprises 5 vector representations of results that have been submitted by 8 human assessors 106.

Finally, the third cluster 406 includes a third subset 412 of the plurality of vector representations. More precisely, third subset 412 comprises 5 vector representations (including the second vector representation 304) of results, that have been submitted by 15 human assessors 106.

Step 812: Executing, by the Server, a Machine Learning (MLA) Algorithm Configured to Generate a First Confidence Parameter and a Second Confidence Parameter: The First Confidence Parameter Corresponding to a Probability of the First Subset Having a Vector Representation of a Correct Result of the Task, the First Confidence Parameter Being Generated Based on One or More Quality Scores Associated with the First Subset of the Plurality of Vector Representations; The Second Confidence Parameter Corresponding to a Probability of the Second Subset Having the Vector Representation of the Correct Result of the Task, the Second Confidence Parameter Being Generated Based on One or More Quality Scores Associated with the Second Subset of the Plurality of Vector Representations.

At step 812, having clustered the plurality of vector representations, the clustering routine 206 is further configured to execute a machine learning algorithm (MLA) 220 trained to calculate a confidence parameter for each of the first cluster 402, the second cluster 404 and the third cluster 406. In some non-limiting embodiments of the present technology, the confidence parameter corresponds to a probability of a given cluster (the first cluster 402, the second cluster 404 and the third cluster 406) including a vector representation of a correct result of the task.

Taking the third cluster 406 as an example, the MLA 220 is configured to determine the probability of the third subset 412 including the vector representation of the correct result to the task, based on the 8 quality scores associated with the third subset 412.

Having determined the first confidence parameter associated with the first cluster 402, the second confidence parameter associated with the second cluster 404 and the third confidence parameter associated with the third cluster 406, the clustering routine 206 is configured to transmit the data packet 222 to the aggregating routine 208. The data packet 222 comprises the first confidence parameter, the second confidence parameter and the third confidence parameter.

Step 814: In Response to a Given One of the First Confidence Parameter and the Second Confidence Parameter Meeting a Predetermined Condition, Generating, by the Server, an Aggregated Vector Representation Based on an Associated One of the First Subset of the Plurality of Vector Representations and the Second Subset of the Plurality of Vector Representations At step 814, in response to receiving the data packet 222, the aggregating routine 208 is configured to execute the following.

Firstly, the aggregating routine 208 is configured to select one of the first confidence parameter, the second confidence parameter and the third confidence parameter meeting a predetermined condition. In some non-limiting embodiments of the present technology, the meeting the predetermined condition corresponds to determining a highest one of the first confidence parameter, the second confidence parameter, and the third confidence parameter.

Let us assume for example that the third confidence parameter, which is associated with the third cluster 406, corresponds to the highest confidence parameter, meaning that the first cluster 402 is determined to have the highest probability of comprising a vector representation of the correct result to the task.

The aggregating routine 208 is further configured to generate an aggregated vector representation of the third subset 412, and transmit the data packet 224 comprising the aggregated vector representation to the selection routine 210.

Step 816: Selecting, by the Server, the Aggregated Vector Representation as the Result of the Task At step 816, in response to receiving the data packet 224, the selection routine 210 is configured to convert the aggregated vector representation into a textual format.

The method 800 then terminates.

It should be apparent to those skilled in the art that at least some embodiments of the present technology aim to expand a range of technical solutions for addressing a particular technical problem encountered by the conventional crowd-sourcing technology, namely determining a correct textual answer, from a plurality of results received by different human assessors, to a task for which the correct answer is unknown.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

While the above-described implementations have been described and shown with reference to particular steps performed in a particular order, it will be understood that these steps may be combined, sub-divided, or reordered without departing from the teachings of the present technology. Accordingly, the order and grouping of the steps is not a limitation of the present technology.

We claim:

1. A method of determining a result for a task executed in a crowd-sourced environment, the task being of a given type of tasks requiring a result in textual format, the method being executed by a server, the method comprising:
   receiving, by the server, a plurality of results of the task having been submitted by a plurality of human assessors of the crowd-sourced environment;
   receiving, by the server, a quality score for each human assessor of the plurality of human assessors, the quality score being indicative of an error rate of the human assessor executing the given type of tasks;
   generating, by the server, a plurality of vector representations comprising a vector representation for each of the results of the plurality of results;
   associating, by the server, each vector representation of the plurality of vector representations, with the quality score of the human assessor associated with each vector representation;
   mapping, by the server, the plurality of vector representations into a vector space;
   clustering, by the server, the plurality of vector representations within the vector space into at least a first cluster and a second cluster, the first cluster including a first subset of the plurality of vector representations and the second cluster including a second subset of the plurality of vector representations;
   executing, by the server, a machine learning (MLA) algorithm configured to determine a first confidence parameter and a second confidence parameter,
      the first confidence parameter corresponding to a probability of the first subset having a vector representation of a correct result of the task, the first confidence parameter being determined based on the quality scores associated with a first subset of the plurality of human assessors previously associated with the first subset of the plurality of vector representations;

the second confidence parameter corresponding to a probability of the second subset having the vector representation of the correct result of the task, the second confidence parameter determined based on the quality scores associated with a second subset of the plurality of human assessors previously associated with the second subset of the plurality of vector representations;

in response to the first confidence parameter being above the second confidence parameter identifying, by the server, a given vector representation of the first subset of the plurality of vector representations as a representative vector for the plurality of vector representations, the given vector representation to be used as an aggregated vector representation for a single textual result of the task; and inputting, by the server, the aggregated vector representation into a vector-to-text routine to generate the single textual result;

selecting, by the server, the single textual result as the result of the task.

2. The method of claim 1, wherein the given type of task is one of a translation task and a speech-to-text conversion task.

3. The method of claim 1, wherein the result is being represented in a textual form, and wherein:

the generating the plurality of vector representations comprises generating a word embedding for each of the plurality of the textual form, using one of a Word2Vec model, a continuous bag-of-words model, and a continuous skip-gram model.

4. The method of claim 1, wherein the clustering the plurality of vector representations is executed by one of a k-means clustering algorithm, a centroid-based clustering algorithm, a distribution-based clustering algorithm, and a density-based clustering algorithm.

5. The method of claim 1, wherein the MLA is a Dawid-Skene model algorithm.

6. The method of claim 1, wherein identifying the given vector representation comprises selecting the given vector representation corresponding to a medoid of the first subset of the plurality of vector representations.

7. The method of claim 1, wherein identifying the given vector representation comprises selecting a most frequent vector representation within the first subset of the plurality of vector representations.

8. The method of claim 1, wherein identifying the given vector representation comprises:

generating a first given vector representation corresponding to a centroid of the first subset of the plurality of vector representations;

selecting from the first subset of the plurality of vector representations a second given vector representation corresponding to a most similar vector representation to the centroid as the given vector representation.

9. A system for determining a result for a task executed in a crowd-sourced environment, the task being of a given type of tasks requiring a result in textual format, the system comprising a server, the server comprising a processor configured to:

receive, by the server, a plurality of results of the task having been submitted by a plurality of human assessors of the crowd-sourced environment;

receive, by the server, a quality score for each human assessor of the plurality of human assessors, the quality score being indicative of an error rate of the human assessor executing the given type of tasks;

generate, by the server, a plurality of vector representations comprising a vector representation for each of the results of the plurality of results;

associate, by the server, each vector representation of the plurality of vector representations, with the quality score of the human assessor associated with each vector representation;

map, by the server, the plurality of vector representations into a vector space;

cluster, by the server, the plurality of vector representations within the vector space into at least a first cluster and a second cluster, the first cluster including a first subset of the plurality of vector representations and the second cluster including a second subset of the plurality of vector representations;

execute, by the server, a machine learning (MLA) algorithm configured to determine a first confidence parameter and a second confidence parameter, the first confidence parameter corresponding to a probability of the first subset having a vector representation of a correct result of the task, the first confidence parameter being determined based on the quality scores associated with a first subset of the plurality of human assessors previously associated with the first subset of the plurality of vector representations;

the second confidence parameter corresponding to a probability of the second subset having the vector representation of the correct result of the task, the second confidence parameter being determined based on the quality scores associated with a second subset of the plurality of human assessors previously associated with the second subset of the plurality of vector representations;

in response to the first confidence parameter being above the second confidence parameter, identify, by the server, a given vector representation of the first subset of the plurality of vector representations as a representative for the plurality of vector representations, the given vector representation to be used as an aggregated vector representation for a single textual result of the task; and input, by the server, the aggregated vector representation into a vector-to-text routine to generate the single textual result;

select, by the server, the single textual result as the result of the task.

10. The system of claim 9, wherein the result is being represented in a textual form, and wherein:

to generate the plurality of vector representations, the processor is configured to generate a word embedding for each of the plurality of the textual form, using one of a Word2Vec model, a continuous bag-of-words model, and a continuous skip-gram model.

11. The system of claim 9, wherein to cluster the plurality of vector representations, the processor is configured to execute one of a k-means clustering algorithm, a centroid-based clustering algorithm, a distribution-based clustering algorithm, and a density-based clustering algorithm.

12. The system of claim 9, wherein the MLA is a Dawid-Skene model algorithm.

13. The system of claim 9, wherein to identify the given vector representation, the processor is configured to select the given vector representation corresponding to a medoid of the first subset of the plurality of vector representations.

14. The system of claim 9, wherein to identify the given vector representation, the processor is configured to select a most frequent vector representation within the first subset of the plurality of vector representations.

15. The system of claim 9, wherein to identify the give vector representation, the processor is configured to:
generate a first given vector representation corresponding to a centroid of the first subset of the plurality of vector representations;
select from the first subset of the plurality of vector representations a second given vector representation corresponding to a most similar vector representation to the centroid as the given vector representation.

* * * * *